US006966861B2

(12) United States Patent
Kwon et al.

(10) Patent No.: US 6,966,861 B2

(45) Date of Patent: Nov. 22, 2005

(54) SHIFT CONTROL FOR A TWO-AXIS AUTOMATIC TRANSMISSION FOR A VEHICLE

(75) Inventors: Hyuk Bin Kwon, Gunpo (KR); Jae Duk Jang, Yongin (KR); Gyung Cheol Lee, Gunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/656,944

(22) Filed: Sep. 5, 2003

(65) Prior Publication Data

US 2004/0092365 A1 May 13, 2004

(30) Foreign Application Priority Data

| | | |
|---|---|---|
| Sep. 5, 2002 | (KR) | 10-2002-0053489 |
| Sep. 5, 2002 | (KR) | 10-2002-0053495 |
| Oct. 24, 2002 | (KR) | 10-2002-0065171 |
| Nov. 8, 2002 | (KR) | 10-2002-0068992 |

(51) Int. Cl.[7] .................... F16H 47/08

(52) U.S. Cl. .................... 475/60; 475/116; 475/121; 475/122; 475/123; 701/54

(58) Field of Search .................... 475/116, 121, 122, 475/123, 60; 701/54

(56) References Cited

U.S. PATENT DOCUMENTS

| | | | | |
|---|---|---|---|---|
| 5,168,776 A * | 12/1992 | Otsubo et al. | 477/109 |
| 5,454,763 A * | 10/1995 | Ikebuchi et al. | 475/128 |
| 5,809,442 A * | 9/1998 | Schulz et al. | 701/51 |
| 5,853,349 A * | 12/1998 | Shimada et al. | 477/143 |
| 5,882,276 A * | 3/1999 | Usuki et al. | 477/120 |
| 6,723,022 B2 * | 4/2004 | Kim | 477/70 |
| 2003/0027679 A1 * | 2/2003 | Sakamoto et al. | 475/120 |

* cited by examiner

*Primary Examiner*—Rodney H. Bonck
*Assistant Examiner*—David D. Le
(74) *Attorney, Agent, or Firm*—Morgan Lewis & Bockius LLP

(57) ABSTRACT

A shift control method for an automatic transmission having a primary shift portion and a secondary shift portion is provided that comprises: starting, if a shift signal is output, a shift in the secondary shift portion, and then starting a shift in the primary shift portion; performing feedback control of duty ratios of friction element solenoids for the primary shift portion with a goal of approaching a change rate of a difference between an input speed and an output speed of the primary shift portion to a first target speed change rate, and simultaneously performing feedback control of duty ratios of friction element solenoids for the secondary shift portion with a goal of approaching a change rate of a turbine speed to a second target speed change rate; and completing the shift in the primary shift portion, and then completing the shift in the secondary shift portion.

44 Claims, 8 Drawing Sheets

SHIFT CONTROL FOR A TWO-AXIS AUTOMATIC TRANSMISSION FOR A VEHICLE

CROSS-REFERENCE TO RELATED APPLICATIONS

This application claims priority of Korean Application Nos. 10-2002-0053489, filed on Sep. 5, 2002, 10-2002-0053495, filed Sep. 5, 2002, 10-2002-0065171, filed Oct. 24, 2002, and 10-2002-0068992, filed Nov. 11, 2002, the disclosures of which are incorporated fully herein by reference.

FIELD OF THE INVENTION

The present invention relates to a shift control method for a two-axis automatic transmission, and more particularly, to such a shift control method that increases shift performance by increasing a shift response through synchronization shift control of two axes.

BACKGROUND OF THE INVENTION

An automatic transmission employed in a vehicle is automatically shifted into a desired gear through hydraulic pressure controls by regulating a plurality of solenoid valves in response to various conditions such as a vehicle driving speed, a throttle valve position, and the like. The solenoid valves control various friction elements using hydraulic pressure.

If a driver moves a select lever to a desired shift range, port change of a manual valve occurs, and then various operating elements of a shift mechanism are selectively operated by hydraulic pressure that is supplied from an oil pump according to duty ratio control of a solenoid valve.

Such an automatic transmission includes a plurality of friction elements. When the automatic transmission is shifted into a target gear, some of the friction elements (off-going friction elements) are released from an engaged state, and others (on-coming friction elements) are engaged from a released state. Shift quality of the automatic transmission is mainly determined by release-start timing and engagement-start timing of the friction elements. Various research for improving the shift quality have been undertaken.

A conventional four forward gear automatic transmission includes only one shift portion (primary shift portion), and it is sufficient to control the primary shift portion for shifting. In a conventional five forward gear automatic transmission having two axes that include two shift portions (primary shift portion and secondary shift portion), five forward gears may be realized through independent control of the primary shift portion and the secondary shift portion.

However, in such a conventional control method for the five forward gear automatic transmission, simultaneous control of the primary shift portion and the secondary shift portion is impossible. It is therefore impossible to realize six forward gears in the conventional five forward gear automatic transmission.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention is to provide a shift control method for realizing six shift speeds, using a 5-speed automatic transmission that is provided with two shift portions, by simultaneously controlling a primary shift portion and a secondary shift portion.

In a preferred embodiment of the present invention, a shift control method for an automatic transmission provided with a primary shift portion in a first axis and a secondary shift portion in a second axis, comprises: (a) starting shift control for the secondary axis by determining control start timing for friction elements of the first and second axes based on vehicle operating conditions, if a shift signal is output, at the point of the output of the shift signal, and if the shift control for the secondary axis is detected, starting shift control for the first axis, and then determining a first axis target change rate for feedback control of the first axis and a second axis target change rate for feedback control of the second axis; (b) performing the feedback control of the first axis according to a change rate of a difference of an input speed and an output speed of the primary shift portion and the first axis target change rate, and the feedback control of the second axis according to a change rate of a turbine speed and the second axis target change rate; and (c) completing a shift of the first axis, then completing a shift of the second axis.

It is preferable that step (a) comprise: determining control start timing of each solenoid valve of the first and second axes based on hydraulic pressure exhaust time and initial fill time at the point of the output of the shift signal; outputting a shift start duty for the second axis according to the determined control start timing; determining the second axis target change rate for the second axis feedback control, if it is determined that shift control is performed in the second axis by the output of the shift start duty for the second axis; outputting a shift start duty for the first axis, if it is determined that the shift control of the second axis has been started; and determined the first axis target change rate for the first axis feedback control, if it is determined that shift control is performed in the first axis by the output of the shift start duty for the first axis.

It is also preferable that step (b) comprise: respectively outputting an initial shift duty for the first axis and an initial shift duty for the second axis; performing the first axis feedback control by determining a first axis calibration duty ratio based on a difference between the change rate of the difference of the input speed and the output speed of the primary shift portion and the determined first axis target change rate, and then by outputting a first axis control duty ratio according to the determined first axis calibration duty ratio; and performing, while the feedback control for the first axis is performed, the second axis feedback control by determining a second axis calibration duty ratio based on a difference between the turbine speed and the determined second axis target change rate, and then by outputting a second axis control duty ratio according to the determined second axis calibration duty ratio.

It is further preferable that the step (c) comprises: estimating a first time period to completion of a shift of the first axis and a second time period to completion of a shift of the second axis, and then determining whether the first time period is less than the second time period; determining whether a shift of the first axis has been completed, if it is determined that the first time period is less than the second time period; returning to the step (b), if it is determined that the shift of the first axis has not been completed; determining whether a shift of the second axis has been completed, if it is determined that the shift of the first axis has been completed; returning to the step (b), if it is determined that the shift of the second axis has not been completed; and completing the shift control, if it is determined that the shift of the second axis has been completed.

Preferably, if it is determined that the first time period is not less than the second time period, the first axis target change rate is reset to such a value that a time period to completion of the shift of the first axis becomes less than a time period to completion of the shift of the second axis, and the control process returns to the step (b).

In another preferred embodiment of the present invention, a shift control method for an automatic transmission provided with a primary shift portion and a secondary shift portion comprises: (a) starting, if a shift signal is output, a shift in the secondary shift portion, and then starting a shift in the primary shift portion; (b) performing feedback control of output duty ratios for an on-coming friction element solenoid of the secondary shift portion with a goal of achieving a predetermined first input speed change rate, and simultaneously performing feedback control of output duty ratios for an off-going friction element solenoid of the primary shift portion with a goal of achieving a predetermined second input speed change rate; and (c) completing the shift in the primary shift portion, and then completing the shift in the secondary shift portion.

It is preferable that the shift signal is an upshift signal in a power-on state, and step (a) comprise: setting a duty ratio of an off-going friction element solenoid for the secondary shift portion to 0%; setting a duty ratio of an off-going friction element solenoid for the primary shift portion to 0%; performing an initial fill for an on-coming friction element of the secondary shift portion by setting a duty ratio of an on-coming friction element solenoid for the secondary shift portion to 100% for a specific period of time; and setting the duty ratio of the on-coming friction element solenoid for the secondary shift portion as an initial coupling duty at a point when the initial fill for the on-coming friction element of the secondary shift portion is completed, and simultaneously repeating a duty on (100% duty ratio) and a duty off (0% duty ratio) of the off-going friction element solenoid for the primary shift portion until a shift start of the secondary shift portion is detected so that a torque capacity ratio of the primary shift portion is maintained to be 1.

It is also preferable that a point of setting the duty ratio of the off-going friction element solenoid to 0% is determined based on hydraulic pressure discharge time and an initial fill time that are calculated at a point of outputting the shift signal.

It is preferable that a start point of the initial fill for the on-coming friction element of the secondary shift portion is determined such that a completion point of the initial fill is later than a point of hydraulic pressure release from the off-going friction element.

It is further preferable that the shift signal is an upshift signal in a power-on state, and step (b) comprise: setting the duty ratio of the on-coming friction element solenoid of the secondary shift portion as an initial duty ratio, and setting the duty ratio of the off-going friction element solenoid of the primary as an initial duty ratio; performing feedback control of the duty ratio of the off-going friction element solenoid of the primary shift portion, and simultaneously performing feedback control of the duty ratio of the on-coming friction element solenoid of the secondary shift portion; and performing an initial fill for an on-coming friction element of the primary shift portion.

It is preferable that the initial duty ratio of the on-coming friction element solenoid of the secondary shift portion is determined based on an input torque drop caused by a shift start of the primary shift portion.

Preferably, the initial duty ratio of the off-going friction element solenoid of the primary shift portion is determined based on learning of a calibration value according to a difference between a target input speed change rate and a real input speed change rate.

It is preferable that start timing of the initial fill for the on-coming friction element of the primary shift portion is determined such that a completion point of the initial fill coincides with an estimated synchronization timing.

Preferably, a time period of the initial fill for the on-coming friction element of the primary shift portion is determined based on learning of a calibration value according to a difference between a present piston stroke value and a previous piston stroke value.

It is preferable that the shift signal is an upshift signal in a power-on state, and step (c) comprise: performing feedback control of a duty ratio of an off-going friction element solenoid of the primary shift portion so that an input speed of the primary shift portion is slightly higher than a synchronization speed, if synchronization of the primary shift portion is detected; outputting an initial coupling duty ratio for an on-coming friction element of the primary shift portion after completion of an initial fill for the on-coming friction element of the primary shift portion; maintaining the initial coupling duty ratio for the on-coming friction element solenoid of the primary shift portion for a specific period of time, and then increasing the duty ratio of the on-coming friction element solenoid of the primary shift portion at a specific rate; stopping the feedback control for the duty ratio of the off-going friction element solenoid of the primary shift portion, and gradually decreasing the duty ratio thereof to 0%; stopping the feedback control for the duty ratio of the on-coming friction element solenoid of the secondary shift portion, and then maintaining a specific duty ratio for a predetermined period of time; completing a shift of the primary shift portion by setting the duty ratio of the on-coming friction element solenoid of the primary shift portion to 100%; and completing a shift of the secondary shift portion by setting the duty ratio of the on-coming friction element solenoid of the secondary shift portion to 100%.

It is preferable that the shift signal is a downshift signal in a power-off state, and that step (a) comprise: setting a duty ratio of an off-going friction element solenoid of the primary shift portion to 0%; setting a duty ratio of an off-going friction element solenoid of the secondary shift portion to 0%; repeating a duty-on (100% duty ratio) and a duty-off (0% duty ratio) of the off-going friction element solenoid of the primary shift portion so that a torque capacity ratio is maintained to be 1; performing an initial fill for an on-coming friction element of the primary shift portion for a specific period of time, and then outputting an initial coupling duty for the on-coming friction element solenoid of the primary shift portion; and outputting an initial duty for the on-coming friction element of the primary shift portion.

It is preferable that a point to set the duty ratio of the off-going friction element solenoid of the secondary shift portion to 0% is determined such that a torque capacity ratio of the secondary shift portion is maintained higher than 1.

Preferably, a start point of the initial fill for the on-coming friction element of the primary shift portion is determined such that a shift start point of the primary shift portion approaches that of the secondary shift portion as closely as possible.

It is further preferable that the initial coupling duty ratio for the on-coming friction element solenoid of the primary shift portion is determined through learning of a calibration value according to a difference between a target speed change rate and a current speed change rate.

It is preferable that the initial duty ratio of the off-going friction element solenoid of the secondary shift portion is determined through learning of a calibration value according to a difference between a target speed change rate and a current speed change rate.

Preferably, the shift signal is a downshift signal in a power-on state, and that step (b) comprise: setting a duty ratio of an off-going friction element solenoid of the primary shift portion to 0%; outputting an initial duty ratio of an on-coming friction element solenoid of the primary shift portion; outputting the duty ratio of an off-going friction element solenoid of the secondary shift portion as a value acquired by adding a calibration duty considering a shift start in the primary shift portion to the initial duty ratio of the off-going friction element of the secondary shift portion; performing feedback control for the duty ratio of the on-coming friction element solenoid of the primary shift portion and feedback control for the duty ratio of the off-going friction element solenoid of the secondary shift portion; and stopping the feedback control for the duty ratio of the on-coming friction element solenoid of the primary shift portion, and then maintaining a specific duty ratio for a specific period of time.

It is preferable that the initial duty ratio of the on-coming friction element solenoid of the primary shift portion is determined through learning of a calibration value according to a difference between a target speed change rate and a current speed change rate.

Preferably, the shift signal is a downshift signal in a power-on state, and that step (c) comprise: stopping feedback control for a duty ratio of an off-going friction element solenoid of the secondary shift portion, and gradually decreasing the duty ratio thereof to 0%; completing a shift in the primary shift portion by setting a duty ratio of an on-coming friction element solenoid of the primary shift portion to 100%; and completing a shift in the secondary shift portion by setting a duty ratio of an on-coming friction element solenoid of the secondary shift portion to 100%.

It is preferable that the shift signal is an upshift signal in a power-off state, and that step (a) comprise: setting a duty ratio of an off-going friction element solenoid of the secondary shift portion to 0%; setting a duty ratio of an off-going friction element solenoid of the primary shift portion to 0%; performing an initial fill for an on-coming friction element of the secondary shift portion for a specific time period, and then outputting an initial coupling duty thereof; performing an initial fill for an on-coming friction element of the primary shift portion for a specific time period, and then outputting an initial coupling duty thereof; outputting a maintenance duty ratio for the off-going friction element solenoid of the primary shift portion; and outputting an initial duty of the on-coming friction element solenoid for the secondary shift portion, if a shift start of the secondary shift portion is detected.

It is preferable that a start point of the initial fill for the on-coming friction element of the secondary shift portion is determined such that a completion point of the initial fill coincides with a hydraulic pressure releasing point of the off-going friction element of the secondary shift portion.

Preferably, the specific time period of the initial fill for the on-coming friction element of the secondary shift portion is determined through learning of a calibration value according to a difference between a piston stroke value at a point of completion of the initial fill and a piston stroke value at a previous stage.

It is preferable that a start point of the initial fill for the on-coming friction element of the primary shift portion is determined such that a point of completion of the initial fill coincides with a hydraulic pressure releasing point of the off-going friction element of the primary shift portion.

Preferably, the specific time period of the initial fill for the on-coming friction element of the primary shift portion is determined through learning of a calibration value according to a difference between a piston stroke value at a point of completion of the initial fill and a piston stroke value at a previous stage.

It is also preferable that the initial coupling duty ratio of the on-coming friction element solenoid of the primary shift portion is determined based on a turbine torque.

Preferably, the initial coupling duty ratio of the on-coming friction element solenoid of the secondary shift portion is determined based on a turbine torque.

It is preferable that the maintenance duty ratio of the off-going friction element solenoid of the primary shift portion is determined such that a torque capacity ratio is maintained to be 0.

It is further preferable that the shift signal is an upshift signal in a power-off state, and that step (b) comprise: outputting an initial duty ratio of an off-going friction element of the primary shift portion and an initial duty ratio of an on-coming friction element of the primary shift portion, if a shift start of the primary shift portion is detected; and respectively performing feedback control of a duty ratio of the off-going friction element solenoid of the primary shift portion, feedback control of a duty ratio of the on-coming friction element solenoid of the primary shift portion, and feedback control of a duty ratio of an on-coming friction element solenoid of the secondary shift portion.

It is also preferable that the shift signal is an upshift signal in a power-off state, and that step (c) comprise: performing feedback control of a duty ratio of an off-going friction element of the primary shift portion such that an input speed of the primary shift portion is slightly higher than a synchronization speed, if shift synchronization of the primary shift portion is detected; stopping feedback control of a duty ratio of an on-coming friction element solenoid of the primary shift portion, then maintaining a specific duty ratio thereof for a specific time period, if the shift synchronization of the primary shift portion is detected, and then increasing the duty ratio thereof at a specific rate; stopping feedback control of a duty ratio of an on-coming friction element solenoid of the secondary shift portion, then maintaining a specific duty ratio thereof for a specific time period, if synchronization of the secondary shift portion is detected, and then increasing the duty ratio thereof at a specific rate; stopping the feedback control of the duty ratio of the off-going friction element solenoid of the primary shift portion, and then setting the duty ratio of the off-going friction element solenoid of the primary shift portion to 0%; completing a shift of the primary shift portion by outputting the duty ratio of the on-coming friction element solenoid of the primary shift portion as 100%; and completing a shift of the secondary shift portion by outputting the duty ratio of the on-coming friction element solenoid of the secondary shift portion as 100%.

It is preferable that the shift signal is a downshift signal in a power-off state, and that step (a) comprise: setting a duty ratio of an off-going friction element solenoid of the secondary shift portion to 0%; setting a duty ratio of an off-going friction element solenoid of the primary shift portion to 0%; performing an initial fill for an on-coming friction element of the secondary shift portion for a specific time period, and then outputting an initial coupling duty thereof; performing an initial fill for an on-coming friction element of the primary shift portion for a specific time period, and then outputting an initial coupling duty thereof; outputting a maintenance duty ratio of the off-going friction element solenoid of the secondary shift portion; outputting an initial coupling duty ratio for a solenoid valve for the on-coming friction element for the primary shift portion, after performing the initial fill for the on-coming friction element of the primary shift portion for the specific period of time; outputting an initial duty ratio of the on-coming friction element solenoid of the secondary shift portion, if a shift start of the secondary shift portion is detected; and outputting an initial duty ratio of the off-going friction element solenoid of the secondary shift portion, if the shift start of the secondary shift portion is detected.

It is preferable that a start point of the initial fill for the on-coming friction element of the secondary shift portion is determined such that a completion point of the initial fill coincides with a releasing point of hydraulic pressure of the secondary shift portion.

It is preferable that the specific time period of the initial fill for the on-coming friction element of the secondary shift portion is determined through learning of a calibration value according to a difference between a piston stroke value at a point of completion of the initial fill and a piston stroke value at a previous stage.

Preferably, a start point of the initial fill for the on-coming friction element of the primary shift portion is determined such that a completion point of the initial fill coincides with a hydraulic pressure releasing point.

It is preferable that the specific time period of the initial fill for the on-coming friction element of the primary shift portion is determined through learning of a calibration value according to a difference between a piston stroke value at a point of completion of the initial fill and a piston stroke value at a previous stage.

It is also preferable that the maintenance duty ratio of the off-going friction element solenoid of the secondary shift portion is determined such that a torque capacity ratio is maintained to be 0.

It is further preferable that the shift signal is a downshift signal in a power-off state, and that step (b) comprise: outputting an initial duty ratio for an on-coming friction element solenoid of the primary shift portion, if a shift start of the primary shift portion is detected; performing feedback control of a duty ratio of an off-going friction element solenoid of the secondary shift portion; performing feedback control of a duty ratio of an on-coming friction element solenoid of the secondary shift portion; and performing feedback control of a duty ratio of the on-coming friction element solenoid of the primary shift portion.

It is also preferable that the shift signal is a downshift signal in a power-off state, and that step (c) comprise: stopping feedback control of a duty ratio of an on-coming friction element solenoid of the primary shift portion, if shift synchronization of the primary shift portion is detected, and then maintaining a specific duty ratio for a specific time period; performing feedback control of a duty ratio of an off-going friction element solenoid of the secondary shift portion such that an input speed is slightly higher than a synchronization speed, if shift synchronization of the secondary shift portion is detected; stopping feedback control of a duty ratio of an on-coming friction element solenoid of the secondary shift portion, if the shift synchronization of the secondary shift portion is detected, and then maintaining a specific duty ratio for a specific time period; increasing a duty ratio of the on-coming friction element solenoid of the primary shift portion at a specific rate for a specific time period; increasing a duty ratio of the on-coming friction element solenoid of the secondary shift portion at a specific rate for a specific time period; completing a shift of the primary shift portion by setting a duty ratio of the on-coming friction element solenoid of the primary shift portion to 100%; and stopping the feedback of the duty ratio of the off-going friction element solenoid of the secondary shift portion after completing the shift of the primary shift portion, and then completing a shift of the secondary shift portion by setting a duty ratio of the on-coming friction element solenoid of the secondary shift portion to 100%.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
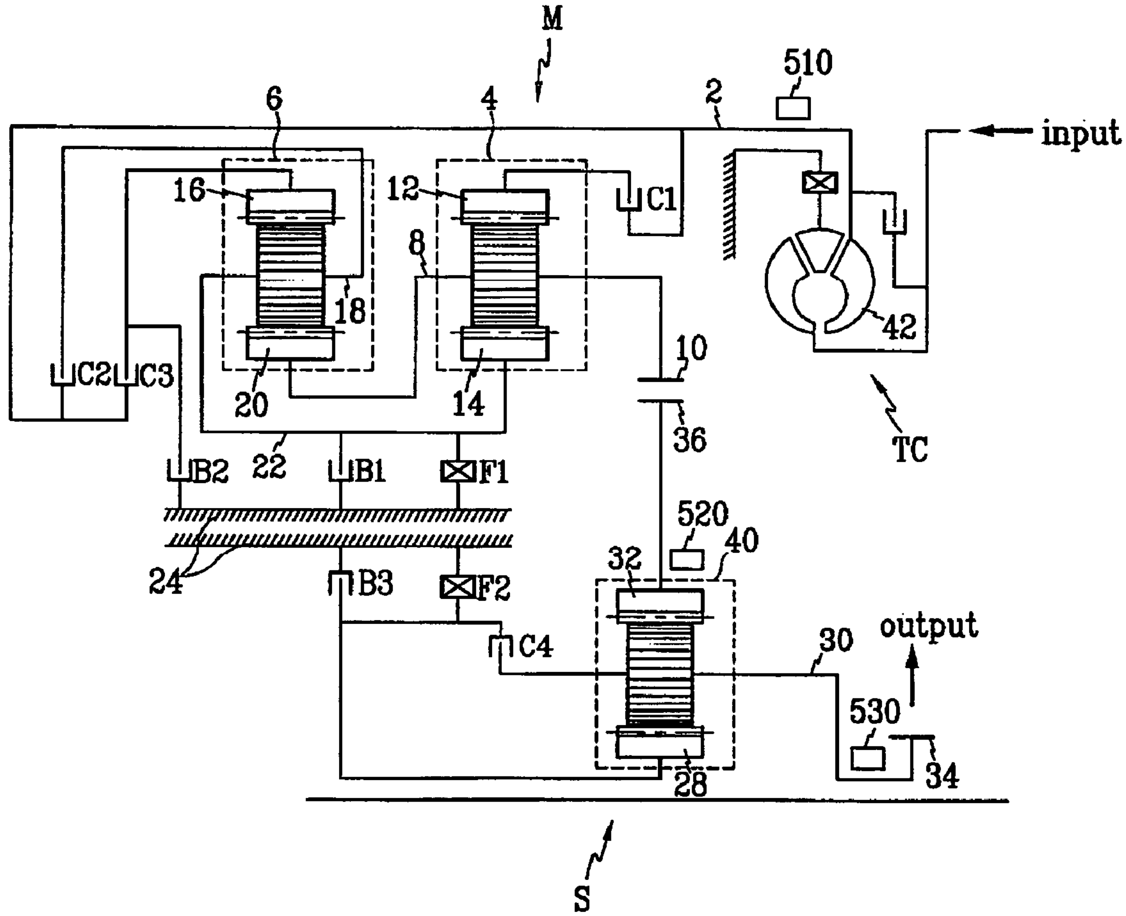
FIG. 1 is a schematic diagram of a power train of an automatic transmission according to a preferred embodiment of the present invention.

As shown in FIG. 1, a two-axis automatic transmission to which a shift control method according to a preferred embodiment of the present invention may be applied includes a primary shift portion, which is designated by reference character "M" in the drawing, and a secondary shift portion, which is designated by reference character "S" in the drawing. The primary shift portion M has two planetary gear sets, a first single-pinion planetary gear set 4 and a second single-pinion planetary gear set 6, and the secondary shift portion S has a third single-pinion planetary gear set 40.

An input shaft 2 of the primary shift portion M receives power from a turbine 42 of a torque converter, which is designated by "TC" in the drawing, and transmits power to the first single-pinion planetary gear set 4 and the second single-pinion planetary gear set 6. A gear is shifted through complementary operations of the first and second single-pinion planetary gear sets 4 and 6. Power is then output through a transfer drive gear 10 coupled to a first planet carrier 8.

The first planet carrier 8, which acts as an output element of the primary shift portion M, is fixedly coupled to a second ring gear 20, and a first ring gear 14 is fixedly coupled to a second planet carrier 18. A first sun gear 12, the second planet carrier 18, and a second sun gear 16 are respectively coupled to the input shaft 2 through a first clutch C1, a second clutch C2, and a third clutch C3. Thus, three input routes are provided.

A connecting member 22, which connects the first ring gear 14 and the second planet carrier 18 together, is variably coupled to a housing 24 through a first brake B1 and a first one way clutch F1, and the second sun gear 16 is variably coupled to the housing 24 through a second brake B2. Thus, two stopping elements are provided.

A third ring gear 32 acts as an input element of the secondary shift portion S, and a third planet carrier 30 acts as an output element of the secondary shift portion S. Power of the primary shift portion M is transferred to the third ring gear 32 through a transfer driven gear 36, which is meshed with the transfer drive gear 10. A third sun gear 28 is coupled to the third planet carrier 30 through a fourth clutch C4, and simultaneously to the housing 24 through a third brake B3 and a second one way clutch F2. Power of the secondary shift portion S is output through an output gear 34 coupled to the third planet carrier 30.

In the automatic transmission of FIG. 1, a first forward drive ratio (first gear) is established by engaging the first clutch C1, the third brake B3, the first one way clutch F1, and the second one way clutch F2. A second forward drive ratio (second gear) is established by engaging the first clutch C1, the second brake B2, and the second one way clutch F2. A third forward drive ratio (third gear) is established by engaging the first clutch C1, the fourth clutch C4, and the first one way clutch F1. A fourth forward drive ratio (fourth gear) is established by engaging the first clutch C1, the fourth clutch C4, and the second brake B2. A fifth forward drive ratio (fifth gear) is established by engaging the first clutch C1, the second clutch C2, and the fourth clutch C4. A sixth forward drive ratio (sixth gear) is established by engaging the second clutch C2, the fourth clutch C4, and the second brake B2. A reverse drive (reverse gear) is established by engaging the third clutch C3, the first brake B1, and the third brake B3.

Figure 2:
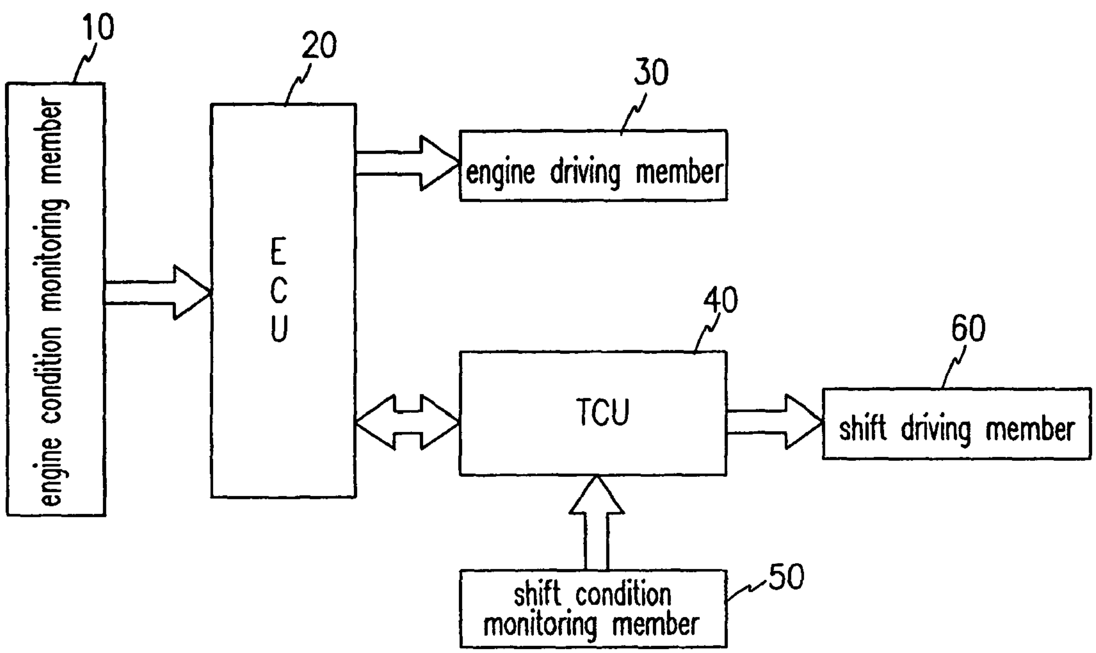
FIG. 2 is a diagram of a system for shift control according to a preferred embodiment of the present invention.

A system of FIG. 2 is utilized to control selective operation of the clutches and the brakes of the automatic transmission of FIG. 1.

If a plurality of signals representing various vehicle driving conditions are fed to an engine control unit (ECU) 200 from an engine condition monitoring member 100, the ECU 200 controls an engine driving member 300, based on the received data and reference data, to operate the engine in an optimal state.

The ECU 200 also sends data, which is required for shift control, to a transmission control unit (TCU) 400, and the TCU 400 controls a shift driving member 600 using data input from the ECU 200 and data fed from a shift condition monitoring member 500.

The ECU 200 and TCU 400 each preferably include a processor, a memory, and other necessary hardware and software components as will be understood by persons skilled in the art, to permit the control unit to communicate with sensors and execute the control functions as described herein.

The engine condition monitoring member 100 may include various sensors configured to collect data for engine control, such as a vehicle speed sensor, a crank angle sensor, an engine rpm sensor, a coolant temperature sensor, a turbine rpm sensor, a throttle position sensor, etc. The shift condition monitoring member 500 may include various sensors configured to collect data for shift control, such as an input shaft rpm sensor, an output shaft rpm sensor, a hydraulic oil temperature sensor, an inhibitor switch, a brake switch, etc. The input shaft rpm sensor 510, a secondary shift portion input shaft rpm sensor 520, and the output shaft rpm sensor 530 are shown in FIG. 1.

The engine driving member 300 may include various actuators for controlling the engine, and the shift driving member 600 may include various solenoid valves for controlling hydraulic pressure of the automatic transmission.

The ECU 200 may send data to the TCU 400 through a CAN (controller network area) communication system.

The CAN communication system may transmit data through a CAN bus line, and various controllers may communicate data with each other through the CAN communication system. In the CAN communication system, when further information is needed for a specific controller, it is possible to respond to such need just by changing software without a change of hardware.

Figure 3A:
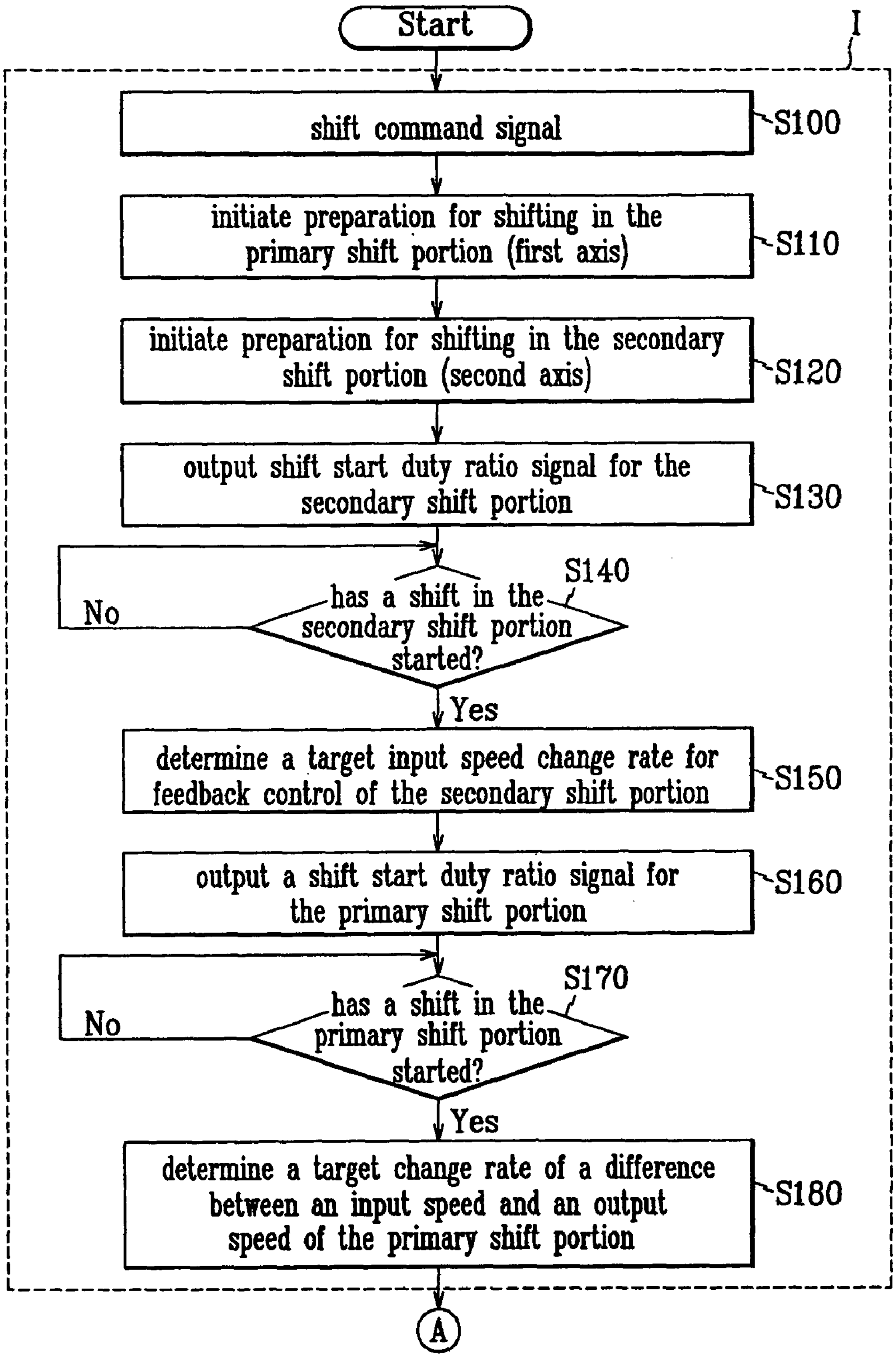
FIGS. 3*a* and 3*b* are flowcharts of a shift control method according to a preferred embodiment of the present invention.
Figure 3B:
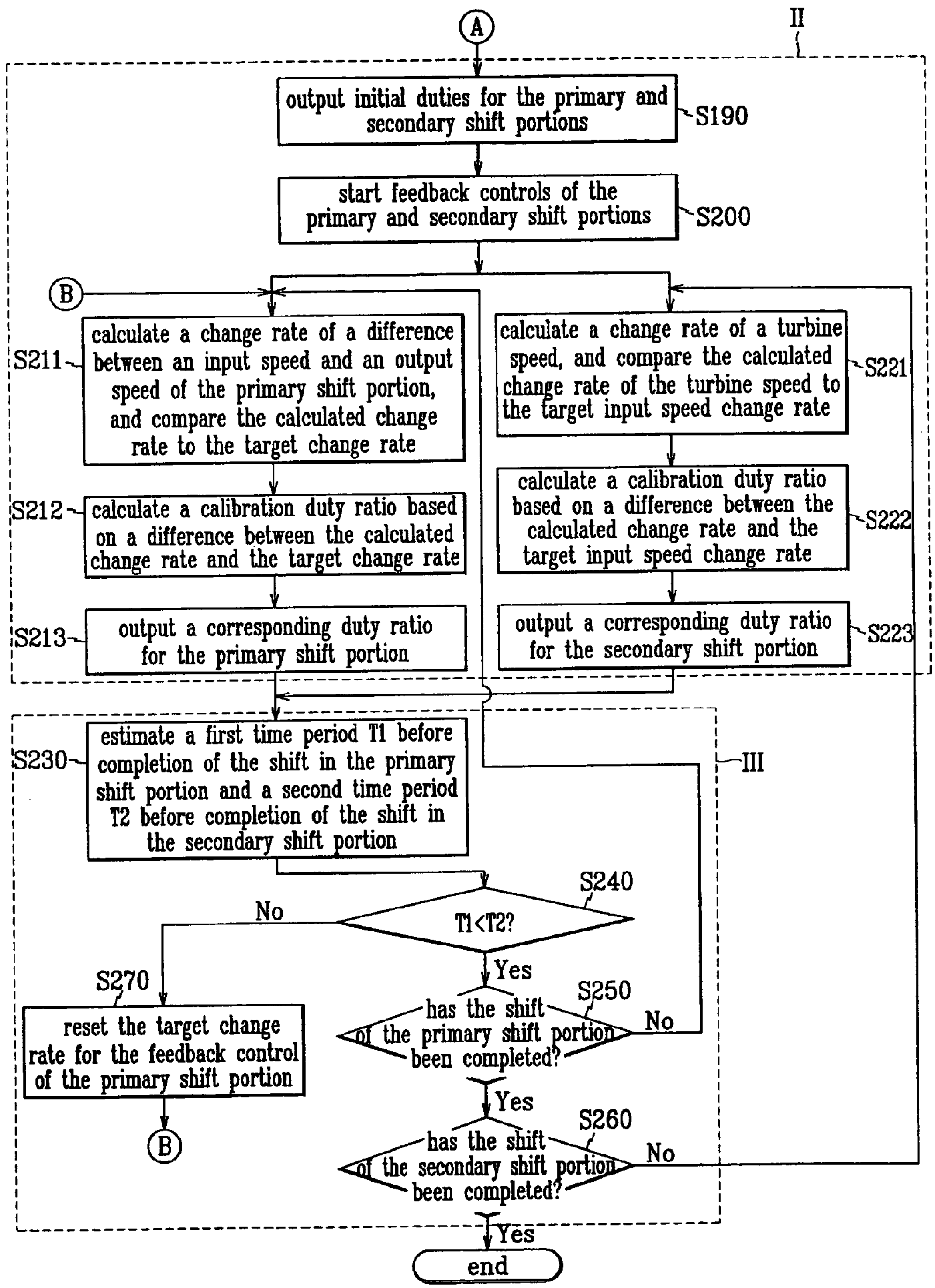

A shift control method according to a preferred embodiment of the present invention will be explained hereinafter while referring to FIGS. 3*a* and 3*b*. As shown in FIGS. 3*a* and 3*b*, the shift control method includes three processes I, II, and III.

In process I, shifting processes are respectively initiated in the primary shift portion (first axis) and the secondary shift portion (second axis), so that a shift start point of the secondary shift portion is prior to that of the primary shift portion.

In process II, feedback control of supplies of hydraulic pressure acting on friction elements of the primary and secondary shift portions are simultaneously performed.

In process III, shifting processes for the primary and secondary shift portions are completed, so that a shift completion point of the primary shift portion is prior to that of the secondary shift portion.

If, at step S100, a shift command signal is output, the TCU 400 initiates preparations for shifting in the primary and secondary shift portions in step S110 and S120, and then, in step S130, a shift start duty ratio signal for the secondary shift portion is output.

The TCU 400 determines, in step S140, whether a shift in the secondary shift portion has started. If so, the TCU 400 determines, in step S150, a target input speed change rate for feedback control of the secondary shift portion. Otherwise, step S140 is repeatedly performed until the shift in the secondary shift portion starts.

In step S160, a shift start duty ratio signal for the primary shift portion is output. The TCU 400 then determines, in step S170, whether a shift in the primary shift portion has started. If so, the TCU 400, in step S180, determines a target change rate of a difference between an input speed and an output speed of the primary shift portion. Otherwise, step S170 is repeatedly performed until a shift in the primary shift portion starts.

As shown in FIG. 3*b*, at step S190, initial duties for the primary shift portion and the secondary shift portion are output, and feedback controls of the primary and secondary shift portions respectively start (step S200).

Feedback control for the primary shift portion is performed as shown in steps S211, S212, and S213.

In step S211, the TCU 400 calculates a change rate of a difference between an input speed and an output speed of the primary shift portion, based on signals of the input shaft rpm sensor 510 and the secondary shift portion input shaft rpm sensor 520, and compares the calculated change rate to the target change rate of the difference between an input speed and an output speed of the primary shift portion.

Then, in step S212, the TCU 400 calculates a calibration duty ratio, based on a difference between the calculated change rate and the target change rate of the difference between an input speed and an output speed of the primary shift portion, and in step S213, a corresponding duty ratio for the primary shift portion is output.

Simultaneously with the feedback control of the primary shift portion, feedback control for the secondary shift portion is performed as shown in steps S221, S222, and S223.

In step S221, the TCU 400 calculates a change rate of a turbine speed, and compares the calculated change rate of the turbine speed to the target input speed change rate for the feedback control of the secondary shift portion. Then, in step S222, the TCU 400 calculates a calibration duty ratio on the basis of a difference between the calculated change rate of the turbine speed and the target input speed change rate for the feedback control of the secondary shift portion, and in step S223, a corresponding duty ratio for the secondary shift portion is output, thereby performing shift control.

Then, in step S230, the TCU 400 estimates a first time period T1 before completion of the shift in the primary shift portion, and a second time period T2 before completion of the shift in the secondary shift portion.

The TCU 400 then, in step S240, determines whether the first period T1 is less than the second period T2. If so, the TCU 400, in step S250, determines whether the shift of the primary shift portion has been completed, and otherwise, the TCU 400, in step S270, resets the target change rate for the primary shift portion, so that the first period T1 is less than the second period T2.

After resetting the target change rate for the primary shift portion in step S270, the process returns to step S211, thereby performing the feedback control for the primary shift portion.

If the determination of step S250 is in the affirmative, the TCU 400 determines whether the shift of the secondary shift portion has been completed, in step S260. If the determination of step S250 is in the negative, the procedure returns to step S211.

If the determination of step S260 is in the affirmative, the procedure ends, and otherwise, the procedure returns to step S221.

To state in brief, if a shift signal is generated by the ECU 200, the shift of the secondary shift portion is initiated prior to the shift of the primary shift portion, and the shift of the primary shift portion is completed prior to the shift of the secondary shift portion.

More specifically, in control process I of FIG. 3*a*, the TCU 400 determines shift control start timing of each solenoid valve based on hydraulic pressure discharge times from friction elements and an initial fill time of friction elements of the primary shift portion and the secondary shift portion. The shift control of the secondary shift portion is initiated in accordance with the determined shift control start timing, and the shift of the primary shift portion is started immediately after a detection of a shift start of the secondary shift portion.

In control process II of FIG. 3*b*, feedback controls of hydraulic pressure of each friction element of the primary and secondary shift portions are respectively performed. In the feedback control of the primary shift portion, a difference between the input and output speed is controlled to approach the target value, and in the feedback control of the secondary shift portion, a turbine speed is controlled to approach the target value.

In the feedback control of the secondary shift portion, the turbine speed is determined as a control target in order to secure good shift operation, and the target value of the feedback control of the secondary shift portion may preferably be determined such that a turbine speed decreases at a constant rate.

The target value of the feedback control of the primary shift portion is determined on the basis of a target shift time at a shift start detection point, and a difference of time between a shift start point of the primary shift portion and a shift start point of the secondary shift portion, and the target value is amended in response to shift conditions.

The target input speed change rate for the feedback control of the secondary shift portion is preferably determined based on a target shift period, an output speed of the transmission, and a gear ratio. The target change rate for the feedback control of the secondary portion can be changed according to shift conditions.

The target change rate of the difference between an input speed and an output speed of the primary shift portion is preferably determined based on a target shift period, a time interval between the shift start points of the primary and secondary shift portions, and a gear ratio. The target change rate of the feedback control of the primary shift portion is maintained until the shift is completed.

The control process III of FIG. 3*b* ensures that the shift of the primary shift portion is completed prior to the shift of the secondary shift portion.

Figure 4:
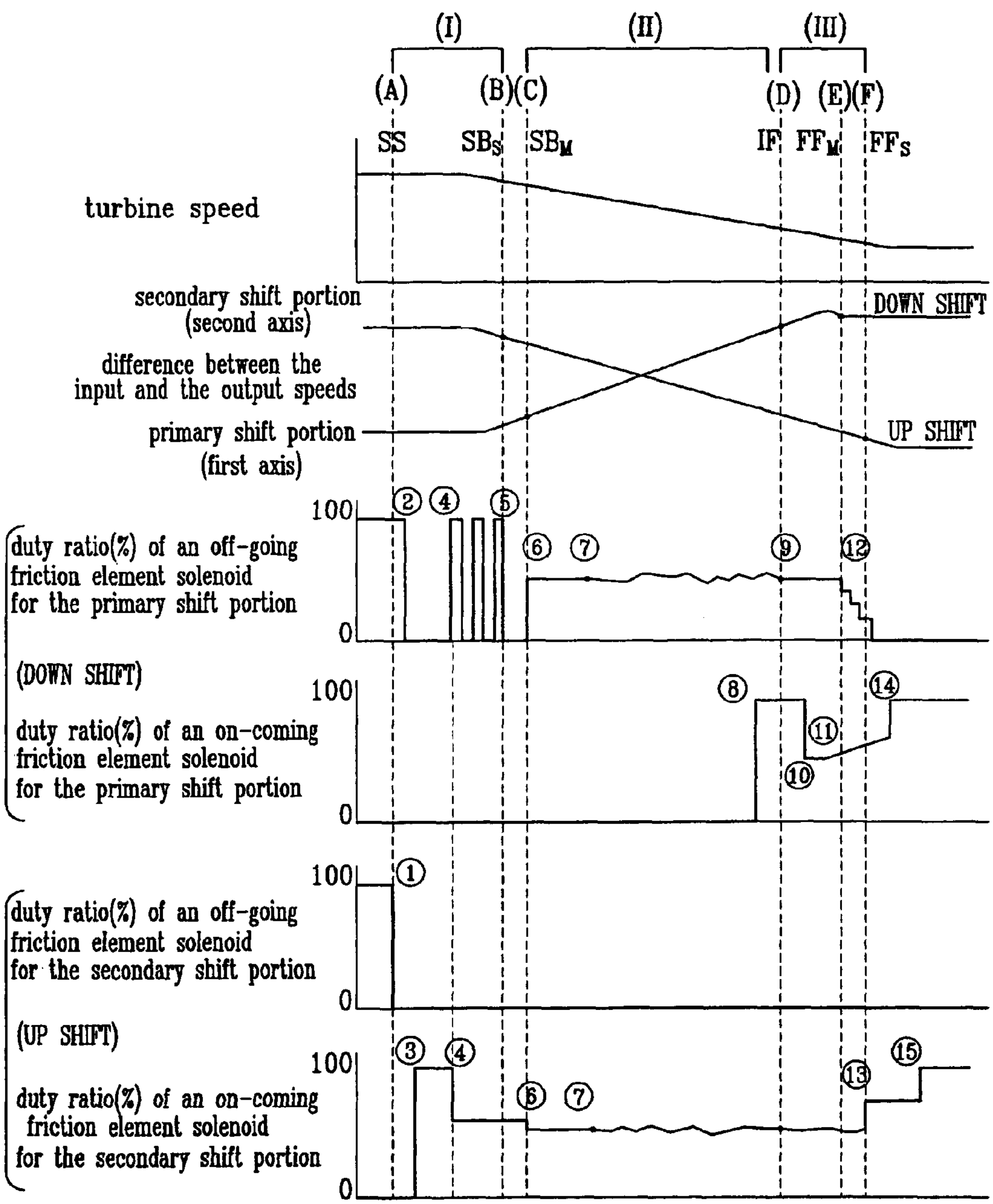
FIG. 4 is a diagram of a shift pattern for power-on upshift in a shift control method according to a preferred embodiment of the present invention.

Referring to FIG. 4, shift control for an upshift in a power-on state according to the preferred embodiment of the present invention will be explained hereinafter.

If an upshift signal is generated in a power-on state of a vehicle (SS), release control for an off-going friction element of the secondary shift portion is started by setting a duty ratio for the off-going friction element of the secondary shift portion to 0% (1), and release control for an off-going friction element of the primary shift portion is started by setting a duty ratio for the off-going friction element of the primary shift portion to 0% (2).

Then, an initial fill for an on-coming friction element of the secondary shift portion is started (3). With completion of the initial fill after a specific period of time, an initial coupling duty ratio for the on-coming friction element of the secondary shift portion is output (4).

Simultaneously, in the primary shift portion, duty on (100%) and duty off (0%) of the off-going friction element are repeated so that a torque capacity ratio may be maintained to be 1 (4).

The release timing, in process (1), of hydraulic pressure for the off-going friction element of the secondary shift portion may preferably be determined based on a hydraulic pressure discharge time and an initial fill time that are calculated at a point of outputting the shift signal (point SS).

The initial fill start timing for the on-coming friction element of the secondary shift portion, in process (3), may preferably be determined such that a completion point of the initial fill of the on-coming friction element of the secondary shift portion is later than the point of hydraulic pressure discharge from the off-going friction element. The initial fill time is determined through learning a calibration value according to a difference between a target period and a real period from the completion of the initial fill to a shift start point.

In process (4), the initial coupling duty ratio for the on-coming friction element of the secondary shift portion may preferably be determined through learning a calibration value according to a difference between a target speed change rate during shifting and a real speed change rate.

If a shift start of the secondary shift portion is detected ($SS_S$), the control (4) (repetition of the duty on and the duty off) for the off-going friction element for the primary shift portion is stopped, and a duty ratio of 0% is then output (5). Then, if a shift start of the primary shift portion is detected ($SB_M$), an initial duty ratio for the on-coming friction element of the secondary shift portion is output, and an initial duty ratio of the off-going friction element of the primary shift portion is output (6).

In control (6), the initial duty ratio of the on-coming friction element of the secondary shift portion may preferably be determined based on an input torque drop by the shift start of the primary shift portion, and the initial duty ratio of the off-going friction element of the primary shift portion may preferably be determined through learning a calibration value in accordance with a difference in target input speed change rate and real input speed change rate.

After outputting the initial duties for the on-coming friction element of the secondary shift portion and the off-going friction element of the primary shift portion, feedback control for an output duty ratio for the on-coming friction element of the secondary shift portion is started with a goal of achieving a predetermined constant input speed change rate (7), and at the same time, feedback control for an output duty ratio for the off-going friction element of the primary shift portion is started with a goal of achieving a predetermined input speed change rate according to an estimated shift completion time of the secondary shift portion (7).

Synchronization timing of the primary shift portion is then estimated, and an initial fill for an on-coming friction element of the primary shift portion is started such that a point of completion of the initial fill coincides with the estimated synchronization timing (8).

The initial fill time is determined through learning a calibration value in accordance with a difference between a current piston stroke value at the point of completion of the initial fill and a piston stroke value of the previous time.

If synchronization of the primary shift portion is firstly detected (IF), feedback control is performed such that an input speed of the off-going friction element of the primary shift portion is slightly higher than synchronization speed (9), and the initial fill for the on-coming friction element of the primary shift portion is stopped. After completing the initial fill in the on-coming friction element of the primary shift portion, an initial coupling duty ratio according to an input duty ratio is output (10), and the duty ratio is gradually increased for a specific period of time (11).

If synchronization of the primary shift portion is secondly detected ($FF_M$), the feedback control of the off-going friction element of the primary shift portion is stopped, and the duty ratio is gradually decreased to 0% (12).

If synchronization of the secondary shift portion is detected, the feedback control of the on-coming friction element of the secondary shift portion is stopped, and a specific duty ratio is maintained for a specific period of time (13). Then, a shift of the primary shift portion is completed by outputting a 100% duty ratio for the on-coming friction element of the primary shift portion (14), and a shift of the secondary shift portion is then completed by outputting a 100% duty ratio for the on-coming friction element of the secondary shift portion (15).

In the power-on upshift according to the preferred embodiment of the present invention, it is possible to allow the turbine speed to gradually decrease without a range of increase, and the shift is performed in the process of the shift start of the secondary shift portion, the shift start of the primary shift portion, the shift completion of the primary shift portion, and the shift completion of the secondary shift portion.

Figure 5:
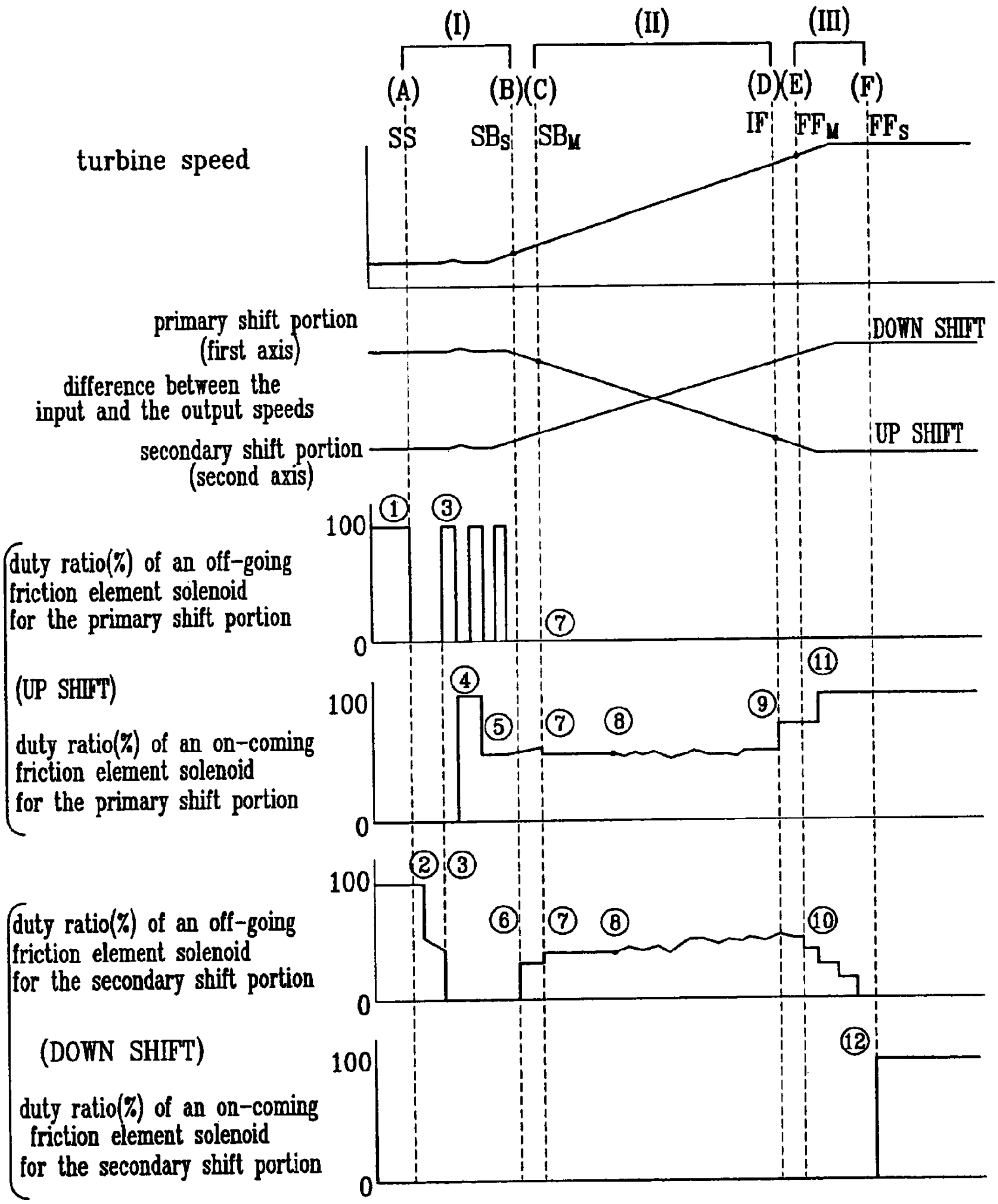
FIG. 5 is a diagram of a shift pattern for power-on downshift in a shift control method according to a preferred embodiment of the present invention.

Referring to FIG. 5, shift control for the downshift in a power-on state according to the preferred embodiment of the present invention will be explained hereinafter.

If a downshift signal is generated in a power-on state of a vehicle (SS), release control is started by setting a duty ratio of a solenoid valve for an off-going friction element of the primary shift portion provided in the first axis to 0% (1), and then by setting a duty ratio of a solenoid valve for an off-going friction element of the secondary shift portion provided in the second axis to 0% (2). During this control, the duty ratio of the solenoid valve for the off-going friction element of the secondary shift portion does not drop to 0 at once, but decreases at a predetermined rate for some period and then drops to 0, as shown in FIG. 5.

In the off-going friction element of the primary shift portion, after control (1), a duty on (100% duty ratio) and a duty off (0% duty ratio) are repeated such that a torque capacity ratio is maintained to be 1 (3). Controls (1) and (3) are processes for preparing a shift start of the primary shift portion shortly after a shift start of the secondary shift portion.

During the repetition of the duty on/off in the off-going friction element of the primary shift portion, an initial fill for an on-coming friction element of the primary shift portion is started (4). After maintaining the initial fill for a predetermined period of time, an initial coupling duty ratio for the solenoid valve for the on-coming friction element of the primary shift portion is output (5).

Then, if a shift start of the secondary shift portion is detected ($SB_S$), an initial duty ratio for the off-going friction element of the secondary shift portion is output (6).

In control process (4), initial start timing of the on-coming friction element of the primary shift portion is determined such that shift start timing of the primary shift portion approaches that of the secondary shift portion as closely as possible. The initial duties in processes (5) and (6) are determined through learning a calibration value corresponding to a difference between a target speed change rate and a real speed change rate.

Then, if a shift start of the primary shift portion is detected ($SB_M$), a 0% duty ratio of the solenoid valve for the off-going friction element of the primary shift portion is output and maintained (7), thereby completely releasing the off-going friction element of the primary shift portion, and an initial duty ratio for the on-coming friction element of the primary shift portion is output (7). At the same time, the duty ratio for the on-coming friction element of the primary shift portion is compensated according to the shift start in the primary shift portion (7).

Then, feedback controls of the on-coming friction element of the primary shift portion and the off-going friction element of the secondary shift portion are respectively performed with a goal of achieving a predetermined input speed change rate (8). If synchronization of the primary shift portion is detected (IF) during the process of the feedback control, the feedback control of the primary shift portion is stopped, and a predetermined duty ratio is maintained for a predetermined period of time (9).

Then, if synchronization of the secondary shift portion is detected ($FF_M$), the feedback control of the off-going friction element of the secondary shift portion is stopped, and the duty ratio for the off-going friction element of the secondary shift portion is gradually decreased to 0% (10). During this process, the shift of the primary shift portion is completed by outputting a 100% duty ratio for the on-coming friction element of the primary shift portion (11).

After process 11, if the duty ratio of the solenoid valve for the off-going friction element of the secondary shift portion reaches 0%, a duty ratio for an on-coming friction element of the secondary shift portion is set to 100% ($FF_S$, 12).

The shift process is controlled with a goal of completing the shift process within 0.8 second, and the target turbine speed change rate is determined to be high in an early stage of the shift in order to decrease a shift period, and to be low nearing the completion of the synchronization, in order to prevent shift shock.

In the power-on downshift according to the preferred embodiment of the present invention, the shift is performed in the process of the shift start of the secondary shift portion, the shift start of the primary shift portion, the shift completion of the primary shift portion, and the shift completion of the secondary shift portion. Therefore, six speeds can be realized using a conventional 5-speed automatic transmission with two axes.

Figure 6:
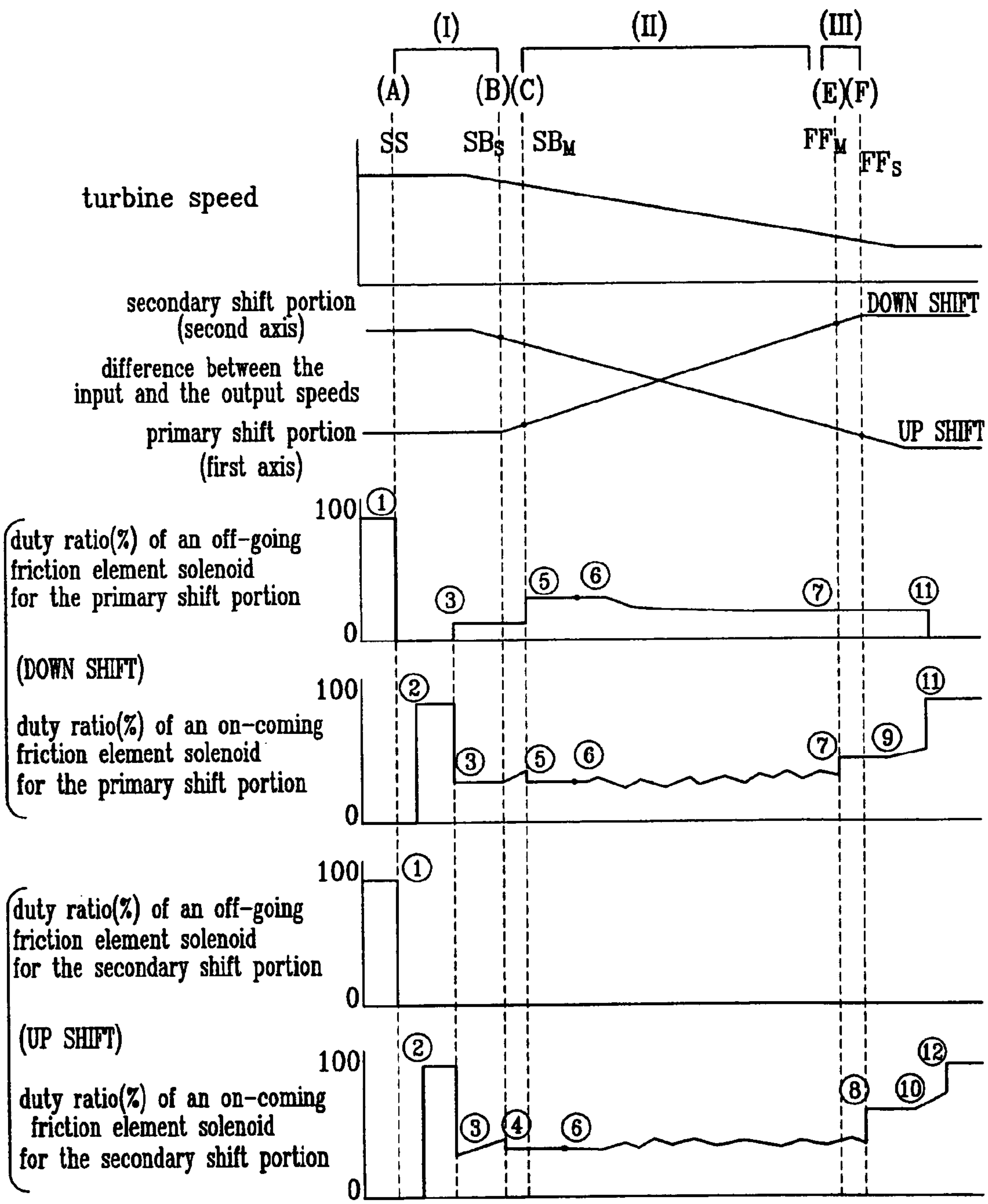
FIG. 6 is a diagram of a shift pattern for power-off upshift in a shift control method according to a preferred embodiment of the present invention.

Referring to FIG. 6, shift control for the upshift in a power-off state according to the preferred embodiment of the present invention will be explained hereinafter.

If a shift signal is output in a power-off state of a vehicle (SS), release control is started by respectively setting a duty ratio for off-going friction elements of the primary and secondary shift portions to 0% (1). Then, after a predetermined period from the start point of the release control, an initial fill for on-coming friction elements of the primary and secondary shift portions is started (2).

In process 2, the start point of the initial fill of the on-coming friction elements of the primary and secondary shift portions is determined such that a completion point of the initial fill coincides with a hydraulic pressure release point of the off-going friction element. The initial fill time is compensated through learning a calibration value according to a difference between a piston stroke value at the point of completion of the initial fill and the stroke value of the previous stage.

After completing the initial fill, an initial coupling duty ratio is output, and at the same time, a duty ratio for the off-going friction element of the primary shift portion is output such that a torque capacity ratio of the off-going friction element of the primary shift portion is maintained to be 0 (3).

During process 3, if a shift start of the secondary shift portion is detected ($SB_S$), an initial duty ratio of the on-coming friction element of the secondary shift portion is output (4). Then, if a shift start of the primary shift portion is detected ($SB_M$), initial duty ratios for the off-going and on-coming friction elements of the primary shift portion are respectively output (5).

In processes 4 and 5, the initial duties are determined according to a turbine torque. After a predetermined period after outputting the initial duties, feedback controls for the off-going and on-coming friction elements of the primary shift portion and for the on-coming friction element of the secondary shift portion are respectively started (6).

While performing the feedback control, if synchronization of the primary shift portion is detected ($FF_M$), the feedback control for the off-going friction element of the primary shift portion is performed such that an input shaft speed is slightly higher than a synchronization revolution speed. At the same time, the feedback control for the on-coming friction element of the primary shift portion is stopped, and the duty ratio for the on-coming friction element of the primary shift portion is maintained at a specific value for a specific period of time (7).

If synchronization of the secondary shift portion is detected ($FF_S$), feedback control of the duty ratio for the on-coming friction element of the secondary shift portion is stopped, and the duty ratio is maintained to be constant for a specific period of time (8). Then, the duty ratios for the on-coming friction elements of the primary and secondary shift portions are increased at specific rates for specific periods of time (9, 10). The feedback control of the duty ratio for the off-going friction element of the primary shift portion is then stopped, and the duty ratio is set to 0%. At the same time, the duty ratio for the on-coming friction element of the primary shift portion is set to 100% (11), and then the duty ratio for the on-coming friction element of the secondary shift portion is set to 100% (12).

In the power-off upshift control according to the preferred embodiment of the present invention, there is no range wherein a turbine speed increases, and the shift is performed in the process of the shift start of the secondary shift portion, the shift start of the primary shift portion, the shift completion of the primary shift portion, and the shift completion of the secondary shift portion.

Figure 7:
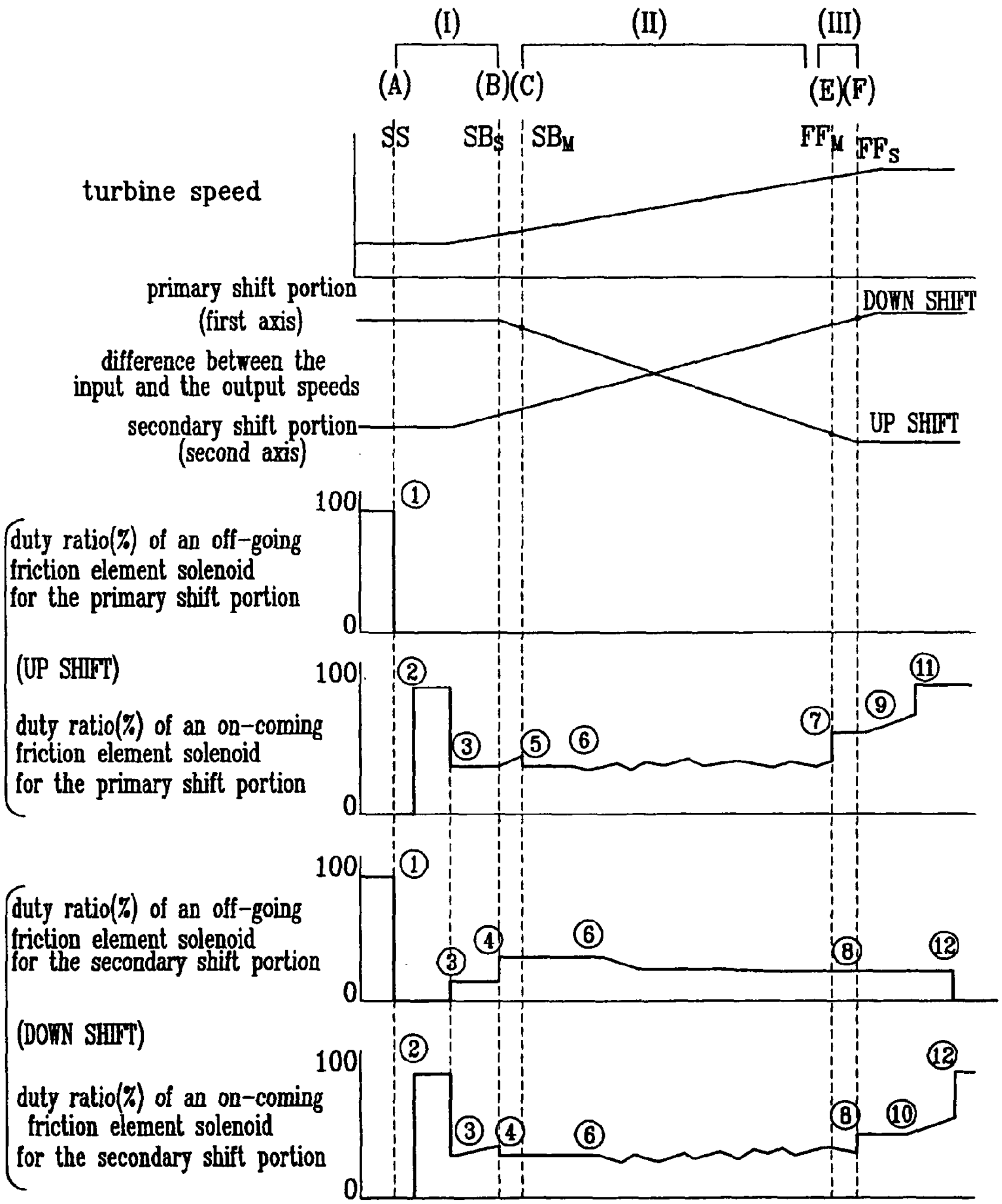
FIG. 7 is a diagram of a shift pattern for power-off downshift in a shift control method according to a preferred embodiment of the present invention.

Referring to FIG. 7, shift control for the downshift in a power-off state according to the preferred embodiment of the present invention will be explained hereinafter.

If a downshift signal is output in a power-off state of a vehicle (SS), release control is started by respectively setting duty ratios for off-going friction elements of the primary and secondary shift portions to 0% (1). After a specific period of time from the release control, initial fills for on-coming friction elements of the primary and secondary shift portions are respectively started (2).

In process 2, the start point of the initial fills for the on-coming friction elements of the primary and secondary shift portions is determined such that a completion point of the initial fill coincides with a hydraulic pressure release point of the off-going friction element. The initial fill time is compensated through learning a calibration value according to a difference between a piston stroke value at the point of completion of the initial fill and the stroke value of the previous stage.

After completing the initial fills for the on-coming friction elements of the primary and secondary shift portions for a specific period of time, initial coupling duty ratios for the on-coming friction elements of the primary and secondary shift portions are respectively output (3), and a duty ratio for the off-going friction element of the secondary shift portion is output as such a value that a torque capacity ratio is maintained to be 0 in order to prevent a piston from returning (3).

During the process, if a shift start of the secondary shift portion is detected ($SB_S$), initial duty ratio controls for the off-going and on-coming friction elements of the secondary shift portion are respectively started (4). Then, if a shift start of the primary shift portion is detected ($SB_M$), an initial duty ratio for the on-coming friction element of the primary shift portion is output (5).

Initial duty ratios for processes (4) and (5) are determined based on turbine torque. Then, feedback controls for the on-coming friction element of the primary shift portion and for the on-coming and off-going friction elements of the secondary shift portions are respectively started (6).

During the feedback control, if synchronization of the primary shift portion is detected ($FF_M$), the feedback control for the on-coming friction element of the primary shift portion is terminated, and the duty ratio for the same is maintained as a specific value for a specific period of time (7).

Then, if synchronization of the secondary shift portion is detected ($FF_S$), feedback control for the on-coming friction element of the secondary shift portion is terminated, and the duty ratio for the same is maintained at a specific value for a specific period of time (8). At the same time, feedback control of the duty ratio of the off-going friction element of the secondary shift portion is performed such that an input revolution speed is slightly higher than a synchronization revolution speed (8).

Then, the duty ratio for the on-coming friction element of the primary shift portion is increased at a specific rate (9), and the duty ratio of the on-coming friction element of the secondary shift portion is also increased at a specific rate (10).

Then, the shift control for the on-coming friction element of the primary shift portion is completed by setting the duty ratio for the on-coming friction element of the primary shift portion to 100% (11).

Then, the feedback control for the off-going friction element of the secondary shift portion is stopped, and the duty for the off-going friction element of the secondary shift portion is set to 0% (12), and at the same time, the duty ratio for the on-coming friction element of the secondary shift portion is set to 100%, thereby completing the shift in the secondary shift portion (12).

In the power-off downshift according to the preferred embodiment of the present invention, the shift is performed in the process of the shift start of the secondary shift portion, the shift start of the primary shift portion, the shift completion of the primary shift portion, and the shift completion of the secondary shift portion.

It is preferable that the shift process is controlled to be completed within 0.8 second. The feedback control is performed so that the shift in the primary shift portion is completed prior to that in the secondary shift portion.

In order to simultaneously control the primary shift portion and the secondary shift portion, the input shaft speed sensor 520 disposed at the input shaft of the secondary shift portion, as well as the conventional input shaft speed sensor 510 and the conventional output shaft speed sensor 530 are used.

As stated in the above, in the shift control according to the preferred embodiment of the present invention, the shift operation is started in the secondary shift portion prior to the primary shift portion, and the shift operation is completed in the primary shift portion prior to the secondary shift portion, and thereby six speeds can be established using the 2-axis automatic transmission.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A shift control method for an automatic transmission provided with a primary shift portion and a secondary shift portion, comprising:

(a) starting shift control for the secondary shift portion by determining control start timing for friction elements of the primary and secondary shift portions based on vehicle operating conditions, if a shift signal is output, at the point of the output of the shift signal, and if shift control for the secondary shift portion is detected, starting shift control for the primary shift portion, and then determining a primary shift portion target change rate for feedback control of the primary shift portion and a secondary shift portion target change rate for feedback control of the secondary shift portion;

(b) performing feedback control of the primary shift portion based on a comparison of a change rate of a difference between an input speed and an output speed of the primary shift portion and the primary shift portion target change rate, and the feedback control of the secondary shift portion based on a comparison of a change rate of a turbine speed and the secondary shift portion target change rate; and (c) completing a shift of the primary shift portion, then completing a shift of the secondary shift portion.

2. The shift control method of claim 1, wherein the step (a) comprises:

determining control start timing of each solenoid valve of the primary and secondary shift portions based on hydraulic pressure exhaust time and initial fill time at the point of the output of the shift signal;

outputting a shift start duty for the secondary shift portion according to the determined control start timing;

determining the secondary shift portion target change rate for the secondary shift portion feedback control, if it is determined that shift control is performed in the secondary shift portion by the output of the shift start duty for the secondary shift portion;

outputting a shift start duty for the primary shift portion, if it is determined that the shift control of the secondary shift portion has been started; and determined the primary shift portion target change rate for the primary shift portion feedback control, if it is determined that shift control is performed in the primary shift portion by the output of the shift start duty for the primary shift portion.

3. The shift control method of claim 1, wherein the step (b) comprises:

respectively outputting an initial shift duty for the primary shift portion and an initial shift duty for the secondary shift portion;

performing the primary shift portion feedback control by determining a primary shift portion calibration duty ratio based on a difference between the change rate of the difference of the input speed and the output speed of the primary shift portion and the determined primary shift portion target change rate, and then by outputting a primary shift portion control duty ratio according to the determined primary shift portion calibration duty ratio; and performing, while the feedback control for the primary shift portion is performed, the secondary shift portion feedback control by determining a secondary shift portion calibration duty ratio based on a difference between the turbine speed and the determined secondary shift portion target change rate, and then by outputting a secondary shift portion control duty ratio according to the determined secondary shift portion calibration duty ratio.

4. The shift control method of claim 1, wherein the step (c) comprises:

estimating a first time period to completion of a shift of the primary shift portion and a second time period to completion of a shift of the secondary shift portion, and then determining whether the first time period is less than the second time period;

determining whether a shift of the primary shift portion has been completed, if it is determined that the first time period is less than the second time period;

returning to the step (b), if it is determined that the shift of the primary shift portion has not been completed;

determining whether a shift of the secondary shift portion has been completed, if it is determined that the shift of the primary shift portion has been completed;

returning to the step (b), if it is determined that the shift of the secondary shift portion has not been completed; and completing the shift control, if it is determined that the shift of the secondary shift portion has been completed.

5. The shift control method of claim 4, wherein if it is determined that the first time period is not less than the second time period, the primary shift portion target change rate is reset to such a value that a time period to completion of the shift of the primary shift portion becomes less than a time period to completion of the shift of the secondary shift portion, and the control process returns to the step (b).

6. A shift control method for an automatic transmission that is provided with a primary shift portion and a secondary shift portion, comprising:

(a) starting, if a shift signal is output, a shift in the secondary shift portion, and then starting a shift in the primary shift portion;

(b) performing feedback control for the secondary shift portion based on a comparison of a change rate of a turbine speed and a secondary shift portion target change rate, and simultaneously performing feedback control for the primary shift portion based on a comparison of a change rate of a difference between an input speed and an output speed of the primary shift portion and a primary shift portion target change rate; and (c) completing the shift in the primary shift portion, and then completing the shift in the secondary shift portion.

7. The shift control method of claim 6, wherein the shift signal is an upshift signal in a power-on state, and the step (c) comprises:

performing feedback control of a duty ratio of an off-going friction element solenoid of the primary shift portion so that an input speed of the primary shift portion is slightly higher than a synchronization speed, if synchronization of the primary shift portion is detected;

outputting an initial coupling duty ratio for an on-coming friction element of the primary shift portion after completion of an initial fill for the on-coming friction element of the primary shift portion;

maintaining the initial coupling duty ratio for the on-coming friction element solenoid of the primary shift portion for a specific period of time, and then increasing the duty ratio of the on-coming friction element solenoid of the primary shift portion at a specific rate;

stopping the feedback control for the duty ratio of the off-going friction element solenoid of the primary shift portion, and gradually decreasing the duty ratio thereof to 0%;

stopping the feedback control for the duty ratio of the on-coming friction element solenoid of the secondary shift portion, and then maintaining a specific duty ratio for a predetermined period of time;

completing a shift of the primary shift portion by setting the duty ratio of the on-coming friction element solenoid of the primary shift portion to 100%; and completing a shift of the secondary shift portion by setting the duty ratio of the on-coming friction element solenoid of the secondary shift portion to 100%.

8. The shift control method of claim 6, wherein the shift signal is a downshift signal in a power-on state, and the step (c) comprises:

stopping feedback control for a duty ratio of an off-going friction element solenoid of the secondary shift portion, and gradually decreasing the duty ratio thereof to 0%;

completing a shift in the primary shift portion by setting a duty ratio of an on-coming friction element solenoid of the primary shift portion to 100%; and completing a shift in the secondary shift portion by setting a duty ratio of an on- coming friction element solenoid of the secondary shift portion to 100%.

9. The shift control method of claim 6, wherein the shift signal is an upshift signal in a power-off state, and the step (b) comprises:

outputting an initial duty ratio of an off-going friction element of the primary shift portion and an initial duty ratio of an on-coming friction element of the primary shift portion, if a shift start of the primary shift portion is detected; and respectively performing feedback control of a duty ratio of the off-going friction element solenoid of the primary shift portion, feedback control of a duty ratio of the on-coming friction element solenoid of the primary shift portion, and feedback control of a duty ratio of an on-coming friction element solenoid of the secondary shift portion.

10. The shift control method of claim 6, wherein the shift signal is an upshift signal in a power-off state, and the step (c) comprises:

performing feedback control of a duty ratio of an off-going friction element of the primary shift portion such that an input speed of the primary shift portion is slightly higher than a synchronization speed, if shift synchronization of the primary shift portion is detected;

stopping feedback control of a duty ratio of an on-coming friction element solenoid of the primary shift portion, then maintaining a specific duty ratio thereof for a specific time period, if the shift synchronization of the primary shift portion is detected, and then increasing the duty ratio thereof at a specific rate;

stopping feedback control of a duty ratio of an on-coming friction element solenoid of the secondary shift portion, then maintaining a specific duty ratio thereof for a specific time period, if synchronization of the secondary shift portion is detected, and then increasing the duty ratio thereof at a specific rate;

stopping the feedback control of the duty ratio of the off-going friction element solenoid of the primary shift portion, and then setting the duty ratio of the off-going friction element solenoid of the primary shift portion to 0%;

completing a shift of the primary shift portion by outputting the duty ratio of the on-coming friction element solenoid of the primary shift portion as 100%; and completing a shift of the secondary shift portion by outputting the duty ratio of the on-coming friction element solenoid of the secondary shift portion as 100%.

11. The shift control method of claim 6, wherein the shift signal is a downshift signal in a power-off state, and the step (b) comprises:

outputting an initial duty ratio for an on-coming friction element solenoid of the primary shift portion, if a shift start of the primary shift portion is detected;

performing feedback control of a duty ratio of an off-going friction element solenoid of the secondary shift portion;

performing feedback control of a duty ratio of an on-coming friction element solenoid of the secondary shift portion; and performing feedback control of a duty ratio of the on-coming friction element solenoid of the primary shift portion.

12. The shift control method of claim 6, wherein the shift signal is a downshift signal in a power-off state, and the step (c) comprises:

stopping feedback control of a duty ratio of an on-coming friction element solenoid of the primary shift portion, if shift synchronization of the primary shift portion is detected, and then maintaining a specific duty ratio for a specific time period;

performing feedback control of a duty ratio of an off-going friction element solenoid of the secondary shift portion such that an input speed is slightly higher than a synchronization speed, if shift synchronization of the secondary shift portion is detected;

stopping feedback control of a duty ratio of an on-coming friction element solenoid of the secondary shift portion, if the shift synchronization of the secondary shift portion is detected, and then maintaining a specific duty ratio for a specific time period;

increasing a duty ratio of the on-coming friction element solenoid of the primary shift portion at a specific rate for a specific time period;

increasing a duty ratio of the on-coming friction element solenoid of the secondary shift portion at a specific rate for a specific time period;

completing a shift of the primary shift portion by setting a duty ratio of the on-coming friction element solenoid of the primary shift portion to 100%; and stopping the feedback of the duty ratio of the off-going friction element solenoid of the secondary shift portion after completing the shift of the primary shift portion, and then completing a shift of the secondary shift portion by setting a duty ratio of the on-coming friction element solenoid of the secondary shift portion to 100%.

13. The shift control method of claim 6, wherein the shift signal is an upshift signal in a power-on state, and the step (a) comprises:

setting a duty ratio of an off-going friction element solenoid for the secondary shift portion to 0%;

setting a duty ratio of an off-going friction element solenoid for the primary shift portion to 0%;

performing an initial fill for an on-coming friction element of the secondary shift portion by setting a duty ratio of an on-coming friction element solenoid for the secondary shift portion to 100% for a specific period of time; and setting the duty ratio of the on-coming friction element solenoid for the secondary shift portion as an initial coupling duty at a point when the initial fill for the on-coming friction element of the secondary shift portion is completed, and simultaneously repeating a duty on (100% duty ratio) and a duty off (0% duty ratio) of the off-going friction element solenoid for the primary shift portion until a shift start of the secondary shift portion is detected so that a torque capacity ratio of the primary shift portion is maintained to be 1.

14. The shift control method of claim 13, wherein a point of setting the duty ratio of the off-going friction element solenoid to 0% is determined based on hydraulic pressure discharge time and an initial fill time that are calculated at a point of outputting the shift signal.

15. The shift control method of claim 13, wherein a start point of the initial fill for the on-coming friction element of the secondary shift portion is determined such that a completion point of the initial fill is later than a point of hydraulic pressure release from the off-going friction element.

16. The shift control method of claim 6, wherein the shift signal is a downshift signal in a power-on state, and the step (a) comprises:

setting a duty ratio of an off-going friction element solenoid of the primary shift portion to 0%;

setting a duty ratio of an off-going friction element solenoid of the secondary shift portion to 0%;

repeating a duty-on (100% duty ratio) and a duty-off (0% duty ratio) of the off-going friction element solenoid of the primary shift portion so that a torque capacity ratio is maintained to be 1;

performing an initial fill for an on-coming friction element of the primary shift portion for a specific period of time, and then outputting an initial coupling duty for the on-coming friction element solenoid of the primary shift portion; and outputting an initial duty for the on-coming friction element of the primary shift portion.

17. The shift control method of claim 16, wherein a point to set the duty ratio of the off-going friction element solenoid of the secondary shift portion to 0% is determined such that a torque capacity ratio of the secondary shift portion is maintained to be higher than 1.

18. The shift control method of claim 16, wherein a start point of the initial fill for the on-coming friction element of the primary shift portion is determined such that a shift start point of the primary shift portion approaches that of the secondary shift portion as closely as possible.

19. The shift control method of claim 16, wherein the initial coupling duty ratio for the on-coming friction element solenoid of the primary shift portion is determined through learning of a calibration value according to a difference between a target speed change rate and a current speed change rate.

20. The shift control method of claim 16, wherein the initial duty ratio of the off-going friction element solenoid of the secondary shift portion is determined through learning of a calibration value according to a difference between a target speed change rate and a current speed change rate.

21. The shift control method of claim 6, wherein the shift signal is a downshift signal in a power-on state, and the step (b) comprises:

setting a duty ratio of an off-going friction element solenoid of the primary shift portion to 0%;

outputting an initial duty ratio of an on-coming friction element solenoid of the primary shift portion;

outputting the duty ratio of an off-going friction element solenoid of the secondary shift portion as a value acquired by adding a calibration duty considering a shift start in the primary shift portion to the initial duty ratio of the off-going friction element of the secondary shift portion;

performing feedback control for the duty ratio of the on-coming friction element solenoid of the primary shift portion and feedback control for the duty ratio of the off-going friction element solenoid of the secondary shift portion; and stopping the feedback control for the duty ratio of the on-coming friction element solenoid of the primary shift portion, and then maintaining a specific duty ratio for a specific period of time.

22. The shift control method of claim 21, wherein the initial duty ratio of the on-coming friction element solenoid of the primary shift portion is determined through learning of a calibration value according to a difference between a target speed change rate and a current speed change rate.

23. The shift control method of claim 6, wherein the shift signal is an upshift signal in a power-off state, and the step (a) comprises:

setting a duty ratio of an off-going friction element solenoid of the secondary shift portion to 0%;

setting a duty ratio of an off-going friction element solenoid of the primary shift portion to 0%;

performing an initial fill for an on-coming friction element of the secondary shift portion for a specific time period, and then outputting an initial coupling duty thereof;

performing an initial fill for an on-coming friction element of the primary shift portion for a specific time period, and then outputting an initial coupling duty thereof;

outputting a maintenance duty ratio for the off-going friction element solenoid of the primary shift portion; and outputting an initial duty of the on-coming friction element solenoid for the secondary shift portion, if a shift start of the secondary shift portion is detected.

24. The shift control method of claim 23, wherein a start point of the initial fill for the on-coming friction element of the secondary shift portion is determined such that a completion point of the initial fill coincides with a hydraulic pressure releasing point of the off-going friction element of the secondary shift portion.

25. The shift control method of claim 23, wherein the specific time period of the initial fill for the on-coming friction element of the secondary shift portion is determined through learning of a calibration value according to a difference between a piston stroke value at a point of completion of the initial fill and a piston stroke value at a previous stage.

26. The shift control method of claim 23, wherein a start point of the initial fill for the on-coming friction element of the primary shift portion is determined such that a point of completion of the initial fill coincides with a hydraulic pressure releasing point of the off-going friction element of the primary shift portion.

27. The shift control method of claim 23, wherein the specific time period of the initial fill for the on-coming friction element of the primary shift portion is determined through learning of a calibration value according to a difference between a piston stroke value at a point of completion of the initial fill and a piston stroke value at a previous stage.

28. The shift control method of claim 23, wherein the initial coupling duty ratio of the on-coming friction element solenoid of the primary shift portion is determined based on a turbine torque.

29. The shift control method of claim 23, wherein the initial coupling duty ratio of the on-coming friction element solenoid of the secondary shift portion is determined based on a turbine torque.

30. The shift control method of claim 23, wherein the maintenance duty ratio of the off-going friction element solenoid of the primary shift portion is determined such that a torque capacity ratio is maintained to be 0.

31. The shift control method of claim 6, wherein the shift signal is an upshift signal in a power-on state, and the step (b) comprises:

setting the duty ratio of the on-coming friction element solenoid of the secondary shift portion as an initial duty ratio, and setting the duty ratio of the off-going friction element solenoid of the primary as an initial duty ratio;

performing feedback control of the duty ratio of the off-going friction element solenoid of the primary shift portion, and simultaneously performing feedback control of the duty ratio of the on-coming friction element solenoid of the secondary shift portion; and performing an initial fill for an on-coming friction element of the primary shift portion.

32. The shift control method of claim 31, wherein the initial duty ratio of the on-coming friction element solenoid of the secondary shift portion is determined based on an input torque drop caused by a shift start of the primary shift portion.

33. The shift control method of claim 31, wherein the initial duty ratio of the off-going friction element solenoid of the primary shift portion is determined based on learning of a calibration value according to a difference between a target input speed change rate and a real input speed change rate.

34. The shift control method of claim 31, wherein start timing of the initial fill for the on-coming friction element of the primary shift portion is determined such that a completion point of the initial fill coincides with an estimated synchronization timing.

35. The shift control method of claim 31, wherein a time period of the initial fill for the on-coming friction element of the primary shift portion is determined based on learning of a calibration value according to a difference between a present piston stroke value and a previous piston stroke value.

36. The shift control method of claim 6, wherein the shift signal is a downshift signal in a power-off state, and the step (a) comprises:

setting a duty ratio of an off-going friction element solenoid of the secondary shift portion to 0%;

setting a duty ratio of an off-going friction element solenoid of the primary shift portion to 0%;

performing an initial fill for an on-coming friction element of the secondary shift portion for a specific time period, and then outputting an initial coupling duty thereof;

performing an initial fill for an on-coming friction element of the primary shift portion for a specific time period, and then outputting an initial coupling duty thereof;

outputting a maintenance duty ratio of the off-going friction element solenoid of the secondary shift portion;

outputting an initial coupling duty ratio for a solenoid valve for the on-coming friction element for the primary shift portion, after performing the initial fill for the on-coming friction element of the primary shift portion for the specific period of time;

outputting an initial duty ratio of the on-coming friction element solenoid of the secondary shift portion, if a shift start of the secondary shift portion is detected; and outputting an initial duty ratio of the off-going friction element solenoid of the secondary shift portion, if the shift start of the secondary shift portion is detected.

37. The shift control method of claim 36, wherein a start point of the initial fill for the on-coming friction element of the secondary shift portion is determined such that a completion point of the initial fill coincides with a releasing point of hydraulic pressure of the secondary shift portion.

38. The shift control method of claim 36, wherein the specific time period of the initial fill for the on-coming friction element of the secondary shift portion is determined through learning of a calibration value according to a difference between a piston stroke value at a point of completion of the initial fill and a piston stroke value at a previous stage.

39. The shift control method of claim 36, wherein a start point of the initial fill for the on-coming friction element of the primary shift portion is determined such that a completion point of the initial fill coincides with a hydraulic pressure releasing point.

40. The shift control method of claim 36, wherein the specific time period of the initial fill for the on-coming friction element of the primary shift portion is determined through learning of a calibration value according to a difference between a piston stroke value at a point of completion of the initial fill and a piston stroke value at a previous stage.

41. The shift control method of claim 36, wherein the maintenance duty ratio of the off-going friction element solenoid of the secondary shift portion is determined such that a torque capacity ratio is maintained to be 0.

42. A shift control method for an automatic transmission having a primary shift portion and a secondary shift portion, said method comprising:

starting shift control for said secondary shift portion and determining a secondary target speed change rate;

starting shift control for said primary shift portion after starting shift control for said secondary shift portion and determining a primary target speed change rate;

performing feedback control for said primary shift portion based on a comparison of a calculated speed change rate of a difference between an input speed and an output speed of the primary shift portion and said primary target speed change rate;

performing feedback control of said secondary shift portion simultaneously with said primary shift portion feedback control, the secondary shift portion feedback control being based on a comparison of a calculated change rate of turbine speed and said secondary target speed change rate; and first completing shifting of said primary shift portion and then completing shifting of said secondary shift portion.

43. The method of claim 42, wherein said calculated speed change rate comprises a difference between an input speed and an output speed of the primary shift portion.

44. The method claim 42, wherein said first completing of said primary shift portion and then completing shifting of said secondary shift portion comprises:

estimating a first time period before completion of shifting in the primary shift portion;

estimating a second time period before completion of shifting in the secondary shift portion;

comparing said first and second time periods;

resetting the target speed change rate for the primary shift portion if said first time period is less than said second time period and repeating performing of said primary shift portion feedback control; and if said first time period is not less than said second time period, repeating performing of said primary shift portion feedback control and said secondary shift portion feedback control until the primary shift portion shifting completes before the secondary shift portion shifting.

* * * * *